United States Patent Office 3,349,046
Patented Oct. 24, 1967

3,349,046
MICROPOROUS PLASTIC SHEET MATERIAL AND METHOD OF MAKING SAME
Jerrold J. Abell, Manchester, and Kenneth J. Virkus, Willimantic, Conn., assignors to Rogers Corporation, Rogers, Conn., a corporation of Massachusetts
No Drawing. Filed Dec. 30, 1963, Ser. No. 334,638
7 Claims. (Cl. 260—2.5)

The present invention relates to a thermosettable permeable microporous plastic sheet material and, more particularly, to the preparation of such a sheet from a composition, the basic ingredients of which are a thermoplastic resin and a monomer capable of cross linking.

The patent to Yarrison, No. 3,067,469, described a method of making a microporous structure which is gas-permeable. In accordance with this patent, granules of thermoplastic resin are distributed as a unifrom layer on a resiliently compressible sheet. A second resiliently compressible sheet is then placed on top of the resin granules, and the assembly is passed between hot plates defining a passage of diminishing thickness to compress the assembly and sinter the resin particles. As a result of this treatment, the resin particles are formed into a strong uniformly sintered sheet. If desired, the first resilient sheet is treated with a bonding agent so that it becomes permanently laminated to the resinous sheet during the sintering process. The second resilient sheet is then stripped off after the sintering step to leave a two-layer composite material. If desired, the second resilient sheet can also be treated with a bonding agent to give a three-layer composite sheet or, alternatively, neither resilient sheet may be treated with a bonding agent and both resilient sheets may be stripped off leaving a self-supporting sintered sheet.

The Yarrison process can be carried out in a continuous and efficient manner and there is produced a product having excellent properties for many uses. However, being formed of thermoplastic resin, this product has disadvantages for certain specialized uses, particularly such use as require resistance to deformation under load, high temperature and various organic solvents.

Accordingly, it is the object of the present invention to provide a process for preparing a thermosettable permeable microporous plastic sheet material by a process having all of the advantages of that disclosed above for preparing a normal permeable microporous thermoplastic sheet material and, further, to provide as a result of this process, a product having the advantages which flow from the fact that the material of which it is composed provides a matrix of thermosettable material.

It has been found that granules of a thermoplastic resin can be blended with a plasticizer which is a polymerizable liquid monomeric compound and processed in the manner generally described by Patent No. 3,067,469 to obtain a permeable microporous thermoplastic sheet, sintering being carried out under conditions which do not polymerize the plasticizer. The thermoplastic sheet so produced can then be heated under pressure under such conditions that polymerization of the plasticizer occurs to produce a sheet containing a matrix of thermosetting polymer surrounded by a thermoplastic compound.

The preferred thermoplastic resin for use in the present invention is a vinyl resin, particularly polyvinyl chloride or a copolymer of vinyl chloride and vinyl acetate containing from 85% to 97% by weight of vinyl chloride. The plasticizer for use with such a resin must be a monomeric liquid compound which is compatible therewith and which contains sufficient ethylenic unsaturation so as to be capable of polymerizing and cross-linking with itself and becoming converted to a thermoset resin. It has been found that diacid ester of a glycol and an unsaturated carboxylic acid are particularly suitable for use as plasticizers in accordance with the present invention and of such esters, acrylic esters are preferred. As specific examples of suitable plasticizers, there may be named ethylene glycol dimethacrylate and polyalkylene dimethacrylates. The alkylene groups of the polyglycols can be any lower alkylene group such as ethylene or propylene, and mixtures of such groups may be present in the molecule.

The proportion of plasticizer to thermoplastic resin in the resin granule may vary widely in accordance with their nature and the properties desired in the final thermoset product. The only real limitation on the upper limit of the amount of plasticizer will be that at which when it is blended with the thermoplastic resin particles, there will no longer be obtained a dry granular material. The minimum amount of plasticizer which may be present is that at which the final thermoset product will not have the resistance to deformation under load, high temperatures or organic solvents which is necessary for the particular use to which the product is to be put. It may be said that when the thermoplastic resin is polyvinyl chloride or a copolymer of vinyl chloride and vinyl acetate, as described above, the ratio of resin to plasticizer will generally be within the range of 10:1 to 1:1, a ratio of about 3:1 being preferred.

A dry blend of resin particles and plasticizer is readily obtained by conventional techniques. It is merely necessary to slowly stir a body of thermoplastic resin granules while adding the plasticizer to the mix.

Ordinarily, there will be added to the dry blend of thermoplastic resin and plasticizer both an inhibitor for the subsequent polymerization of the plasticizer and a catalyst for promoting this polymerization. The inhibitor will tend at the time of the sintering step to prevent the occurrence of polymerization of the plasticizer to obtain a thermoset resin, the polymerization catalyst being inactive under the conditions then existing. However, during the final heating under pressure to effect polymerization of the plasticizer and convert the same to a thermoset resin, the polymerization catalyst will be effective to promote this reaction.

Any of the conventional inhibitors of polymerization are suitable for use in the present invention and as a specific example of such an inhibitor, there may be mentioned the product known by the trade name Ionol Inhibitor and manufactured by the Shell Chemical Company, this material being a tri-substituted phenol. Similarly, any of the usual catalysts which promote vinyl type polymerization may be employed and, in particular, there may be mentioned the general class of organic peroxides. Dicumyl peroxide may be named as a specific organic peroxide which may be used as the catalyst for polymerization. The inhibitor and catalyst will be added in quite minor proportions, the inhibitor within the range of 1/400–1/10% and the catalyst within the range of 0.1–5.0%, both being based on the weight of the plasticized resin composition.

The average size of the individual particles of the plasticized resin for use in the present invention will preferably be such that they will pass through a 30-mesh screen as was specified in the aforementioned Yarrison patent. Also, as mentioned in that patent, the thermoplastic resin can be combined with fillers and pigments or dyes.

The dry blend of thermoplastic resin particles, plasticizer, polymerization inhibitor and polymerization catalyst is processed to obtain a permeable microporous thermoplastic sheet by the procedure described in Yarrison Patent No. 3,067,469. Care must, of course, be taken during the sintering step when the resin granules are under the influence of heat and pressure that the conditions be controlled so that there is no substantial polymerization of the plasticizer. It is difficult to define these conditions specifically, since they can vary quite widely depending upon the exact composition of the plasticizer, catalyst and inhibitor. However, conditions which will effect the sintering together of the individual resin particles without effecting polymerization of the plasticizer can readily be determined by one skilled in the art in each individual case. It has been found that cure or polymerization of plasticizer can be greatly inhibited when the plasticizer is a diacid ester of a glycol and an unsaturated carboxylic acid by insuring free access of air to the material during the sintering operation. This expedient permits sintering under temperature conditions which would otherwise cause polymerization of the plasticizer to occur. In general, it may be stated that when employing resins and plasticizers of the type specified, the sintering temperature will be maintained within the range of 200° F.–400° F.

In the carrying out of the present invention, as was also described in the specification of the Yarrison patent, it is preferred that the sheet be cooled immediately after the sintering step. It can then be wound into rolls and stored for indefinite periods of time at ambient temperatures until it is desired to convert it into a thermoset resin article, since there is little tendency for polymerization of the plasticizer to occur until heat and pressure are applied. As disclosed by the Yarrison patent, one or both of the resiliently compressible sheets contacting the top and bottom of the layer of resin granules can be permanently secured in place to provide a two-layer or three-layer laminate or both can be stripped off to provide a sheet comprising a single self-sustaining layer of sintered resin particles.

Before carrying out the final step of heating the sheet of thermoplastic resin under pressure to cure it, it is cut into sheets of the approximate size and configuration desired in the final thermoset article. The cut pieces are then placed in a conventional molding press and maintained at a suitable temperature and pressure until polymerization of the plasticizer is completed. The suitable conditions for temperature and pressure will vary widely in accordance with the types of thermoplastic resin and plasticizer employed, but suitable conditions can readily be determined by one skilled in the art. In general, it may be said that the temperature should be within the range of 240° F. to 350° F. and the pressure within the range of 100 p.s.i. to 2000 p.s.i. In the case of a sheet in which the resin is polyvinyl chloride or a copolymer of vinyl chloride and vinyl acetate and the plasticizer is a diacid ester of a glycol and an unsaturated carboxylic acid, it has been found that press curing at 310° F. and a pressure of 1000 p.s.i. is particularly suitable. The time of curing will, of course, vary in accordance with the temperature. The time required to effect substantially complete polymerization of the plasticizer can readily be determined in each instance.

Since the final product comprises a thermosetting resinous compound, it will be apparent that the article produced may be of irregular configuration since even shapes having compound curvatures will be maintained after curing.

It was pointed out earlier that the presence of air would inhibit curing. Final curing in a conventional molding press has the advantage that air is excluded during the final curing step.

The following example is set forth to illustrate a preferred embodiment of the invention, but is not to be construed as limiting the same.

*Example*

A dry blend was prepared by mixing the following substances in the stated parts by weight:

| Resin: | Parts by weight |
|---|---|
| Copolymer of vinyl chloride and vinyl acetate (97% chloride, 3% acetate) | 50 |
| Copolymer of vinyl chloride and vinyl acetate (87% chloride, 13% acetate) | 50 |
| Plasticizer: Ethylene glycol dimethacrylate | 32 |
| Inhibitor: Tributylphenol | .005 |
| Catalyst: Dicumyl peroxide | 2.85 |

After thorough blending, the resulting plasticized resin particles were processed in the apparatus disclosed by Yarrison Patent No. 3,067,569. No adhesive was applied to either of the resiliently compressible sheets contacting the upper and lower surfaces of the layer of resin granules. The thermoplastic resin particles were heated to a temperature of about 275° F. during sintering and then cooled to a temperature of about 80° F. Both of the resiliently compressible sheets were stripped from the layer of sintered thermoplastic resin granules and it was wound into a roll and stored.

Rectangular sheets, 6 in. x 6 in., were cut from the roll and placed between the platens of a conventional molding press. The sheets were heated in the press for 10 minutes at a pressure of 1000 p.s.i. and temperature of 300° F. and there were produced rigid cured plastic sheets.

One of the cured articles thus formed was weighed, extracted for 24 hours in methyl ethyl ketone, dried and then weighed again. A loss in weight of 40% was found to have occurred. When the experiment was repeated on a similar sheet containing only the vinyl resins, the entire sheet dissolved.

Another of the thermoset articles was tested for its deformation under load and this was found to be only 2.00% at 50° C. while a similar sheet containing only the vinyl resins showed 7.05% deformation under the same conditions. By way of comparison a molded phenolic sheet showed 1.05% deformation.

It will be apparent that many modifications and variations may be effected without departing from the spirit of the present invention, and the illustrative details disclosed are not to be construed as imposing unnecessary limitations on the invention.

What is claimed is:

1. A permeable microporous thermoplastic resinous sheet comprising a layer of sintered granules of at least one thermoplastic resin selected from the group consisting of polyvinyl chloride and a copolymer of vinyl chloride and vinyl acetate, said copolymer containing from 85% to 97% by weight of vinyl chloride, said granules of resin being plasticized with a compatible liquid monomeric diacid ester of a glycol and an unsaturated carboxylic acid, said ester being capable of being polymerized to produce a thermoset resin, said granules also containing a polymerization inhibitor which prevents polymerization of said ester during sintering and a polymerization catalyst.

2. The plastic sheet of claim 1 in which said ester is an acrylic ester.

3. The plastic sheet of claim 2 in which said ester is a polyalkylene glycol dimethacrylate.

4. The plastic sheet as claimed in claim 1 in which said resin is a mixture of approximately equal parts of a copolymer of vinyl chloride and vinyl acetate containing about 97% of said chloride and about 3% of said acetate and a copolymer of vinyl chloride and vinyl acetate containing about 87% of said chloride and about 13% of said acetate.

5. The plastic sheet of claim 1 in which said inhibitor is a phenolic compound and said catalyst is an organic peroxide.

6. The plastic sheet as claimed in claim 1 in which the ratio of resin to ester in said granules is within the range of 10:1 to 1:1.

7. The plastic sheet of claim 6 in which said ratio is approximately 3:1.

References Cited

UNITED STATES PATENTS

| | | | |
|---|---|---|---|
| 1,815,959 | 7/1931 | Wilderman | 264—112 |
| 2,762,784 | 9/1956 | Foust et al. | 260—2.5 |
| 3,054,761 | 9/1962 | Moore et al. | 260—2.5 |
| 3,056,704 | 10/1962 | Rothweiler et al. | 264—112 |
| 3,066,110 | 11/1962 | Cornell | 260—2.5 |
| 3,067,469 | 12/1962 | Yarrison | 260—2.5 |
| 3,157,713 | 11/1964 | Leese | 260—884 |
| 3,247,289 | 4/1966 | Sears | 260—884 |

MURRAY TILLMAN, *Primary Examiner.*

ROBERT F. WHITE, *Examiner.*

F. WHISENHUNT, M. FOELAK, *Assistant Examiners.*